April 1, 1969 K. SCHLECHT 3,435,772

VARIABLE DIAMETER STATOR FOR SCREW PUMP

Filed March 14, 1967

Inventor:
KARL SCHLECHT
By: Noek & Noek
ATTORNEYS

United States Patent Office 3,435,772
Patented Apr. 1, 1969

3,435,772
VARIABLE DIAMETER STATOR FOR SCREW PUMP
Karl Schlecht, 7024 Bernhausen, Filder, Germany
Filed Mar. 14, 1967, Ser. No. 622,999
Claims priority, application Germany, Mar. 15, 1966, Sch 38,663
Int. Cl. F04c 3/00
U.S. Cl. 103—117                                    7 Claims

ABSTRACT OF THE DISCLOSURE

A stator for a screw pump comprises a tubular jacket. The jacket has an axis and may have a plurality of slots formed therethrough which are parallel to the axis, equiangularly spaced from each other and of equal length less than the length of the jacket. The jacket may comprise a pair of spaced annular end rings joined by a plurality of equiangularly spaced flat bar connecting members extending parallel to the axis. Elastic material is positioned on the inside surface of the jacket and forms an axially extending hollow space around the axis in a worm configuration; the hollow space having a cross-sectional area at each point along the axis. Pressure apparatus applies pressure to the outside surface of the jacket directed toward the inside thereof to compress the cross-sectional area of the hollow space formed by the elastic material. The pressure apparatus is a clamping sleeve or a pressure cylinder around the jacket with a pressure medium in a pressure chamber formed by the space between the jacket and the pressure cylinder.

BACKGROUND OF THE INVENTION

Field of the invention

The present invention relates to a stator for a screw pump. More particularly, the invention relates to a variable diameter stator for an eccentric screw pump.

Description of the prior art

In an eccentric screw pump of the type of the present invention, a worm having a single round thread rotates about its axis in a hollow space formed by elastic material of the stator. The hollow space has a double-threaded round thread configuration having the same pitch as the worm. The screw pump thus functions to pump, displace, move or convey rough construction materials such as, for example, plaster, concrete and the like.

An eccentric screw pump is subjected to a considerable degree of wear and abrasion on the inside surface of the elastic material of the stator, especially when the pump conveys abrasive material. Abrasion of the elastic material causes a loss of elasticity or pretension of such material with respect to the worm or screw and such loss results in a substantial decrease in the conveying capacity of the pump due to internal slippage.

Prior art devices attempt to provide sufficient pretensioning or elasticity of the elastic material in order to compensate for abrasion and/or wear of such material and thereby prolong the service life of the stator and thus of the pump. The devices of the prior art are quite expensive and are especially unsuitable for operation under field conditions at construction sites. Worn stators have been replaced by new stators with hollow spaces of smaller cross-sectional areas. When the cross-sectional area of the hollow space is decreased, the initial pressure is increased and the service life of the screw pump is prolonged. When the screw or worm of the screw pump is worn or abraded, the service life of the pump is prolonged by replacing such worm.

SUMMARY OF THE INVENTION

The principal object of the present invention is to provide a new and improved stator for a screw pump. The stator of the present invention has a variable diameter and overcomes the disadvantages and shortcomings of the prior art stators. The stator of the present invention has a prolonged service life at no extra expense and compensates for wear and abrasion without extra expense. The stator of the present invention compensates for wear and abrasion of the worm and the stator without replacing either said worm or said stator. The stator of the present invention compensates for wear and abrasion of the worm and the stator in a very simple manner and while the pump is in operation, so that it is not necessary to shut down the pump while adjusting it. The stator of the present invention continues to compensate for worm and stator wear until the worm and stator are so completely worn that they no longer retain their proper configuration and the pump is no longer able to displace, convey, move or pump material. The stator of the present invention is efficient, effective and reliable in operation.

In accordance with the present invention, a stator for a screw pump comprises a tubular jacket having an axis. Elastic material on the inside surface of the tubular jacket forms an axially extending hollow space around the axis in a worm configuration. The hollow space has a cross-sectional area at each point along the axis. Pressure apparatus applies pressure to the outside surface of the tubular jacket directed toward the inside thereof thereby to compress the cross-sectional area of the hollow space formed by the elastic material.

The pressure apparatus may comprise a clamping sleeve coaxially positioned on the tubular jacket and mechanical means for decreasing the diameter of the clamping sleeve. The pressure apparatus may comprise a pressure cylinder coaxially positioned around the tubular jacket and radially spaced from the tubular jacket to form a substantially annular pressure chamber around the tubular jacket and a pressure medium in the pressure chamber.

In one modification of the invention, the tubular jacket has a plurality of slots formed therethrough, each of the slots extending parallel to the axis. Each of the slots extends for less than the determined length of the tubular jacket. The slots are equiangularly spaced from each other and are of equal length.

In another modification of the invention, the tubular jacket comprises a pair of spaced end rings of substantially annular configuration and a plurality of connecting members joining the end rings. Each of the connecting members are equiangularly spaced from each other and each of the connecting members is of substantially flat bar configuration. The connecting members are affixed to the inside cylindrical surfaces of the end rings.

BRIEF DESCRIPTION OF THE DRAWING

In order that the present invention may be readily carried into effect, it will now be described with reference to the accompanying drawing, wherein.

DESCRIPTION OF THE PREFERRED EMBODIMENTS

Figure 1:
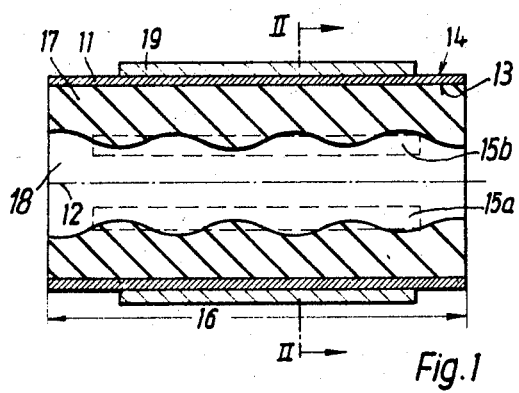
FIG. 1 is an axial section of an embodiment of the stator of the present invention for a screw pump.
Figure 2:
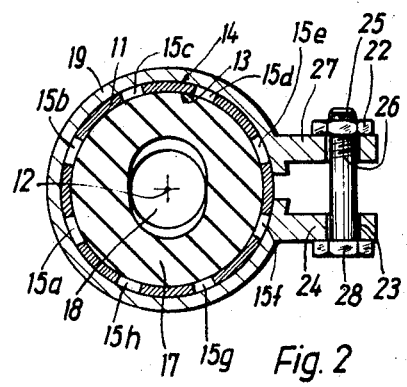
FIG. 2 is a cross-sectional view of the embodiment of FIG. 1, taken along the lines II—II of FIG. 1.

In FIGS. 1 and 2, the stator comprises a tubular jacket 11 having an axis 12. The tubular jacket 11 has an inside surface 13 of cylindrical configuration and an outside surface 14 of cylindrical configuration. A plurality of slots 15a, 15b, 15c, 15d, 15e, 15f and 15g and 15h are formed through the tubular jacket 11, only the slots 15a and 15b being shown in FIG. 1 in order to maintain the clarity of illustration.

Each of the slots 15a to 15h is of substantially rectangular configuration and of the same dimensions as the others of said slots. Each of the slots 15a to 15h extends parallel to the axis 12. The tubular jacket 11 has a determined length 16 parallel to the axis 12 and the slots 15a to 15h extend for less than the determined length 16 thus leaving two annular end-pieces with no slots therein. The slots 15a to 15h are equiangularly spaced from each other and are of equal length and dimensions.

Elastic material 17 on the inside surface 13 of the tubular jacket 11 forms a tubular body with an axially extending hollow space 18 around the axis 12 in a worm configuration. The hollow space 18 has a cross-sectional area at each point along the axis 12. Since the elastic material 17 is the same and is of the same configuration in each of the modifications illustrated, it is labelled with the same reference numeral in each of the figures.

Pressure apparatus applies pressure to the outside surface 14 of the tubular jacket 11 directed toward the inside of said tubular jacket to compress or decrease the cross-sectional area of the hollow space 18 formed by the elastic material 17. In the modifications of FIGS. 1 to 4, the pressure apparatus comprises a clamping sleeve 19 which is coaxially positioned on the tubular jacket 11. A mechanical device is utilized to decrease the diameter of the clamping sleeve 19. The mechanical device comprises a bolt 21 and a nut 22. The bolt 21 passes through an aperture 23 formed through a first extending portion 24 at a first end of the clamping sleeve 19. The first extending portion 24 extends along the length of the clamping sleeve 19 parallel to the length of the tubular jacket 11. At its threaded end 25, the bolt 21 passes through an aperture 26 formed through a second extending portion 27 at a second end of the clamping sleeve 19. The second extending portion 27 extends along the length of the clamping sleeve 19 parallel to and spaced from the first extending portion 24.

There may be one, two, three or more bolt 21 arrangements on a clamping sleeve 19 in spaced parallel relation to each other. The number of bolts 21 utilized depends upon the length of the clamping sleeve 19. When the nut 22 is rotated about the axis of the bolt 21 in a direction which moves said nut toward the head 28 of said bolt, the first and second extending portions 24 and 27 are moved closer toward each other thereby decreasing the diameter of the clamping sleeve 19 and the cross-sectional area of the hollow space 18 formed by the elastic material 17. The decrease or compression of the cross-sectional area of the hollow space 18 compensates for wear or abrasion of the elastic material 17 and for wear or abrasion of the worm (not shown in the figures).

The worm or screw (not shown in the figures) is rotatably mounted in the hollow space 18 coaxially with the tubular jacket 11. The tubular jacket 11 compresses a suitably strong material, preferably a metal such as, for example, iron. The elastic material 17 is affixed to the inside surface 13 of the tubular jacket 11 by any suitable means such as, for example, vulcanization, glue, notches, or the like, so that said tubular jacket prevents distortion or twisting of said elastic material.

Since the length of the clamping sleeve 19 is less than the length of the slots 15a to 15h, the nonslotted end portions of the tubular jacket 11 retain a constant diameter during the tightening of said clamping sleeve to decrease its diameter. The clamping sleeve 19 is positioned on the tubular jacket 11 in a manner whereby the space between the first and second extending portions 24 and 27 of said sleeve appears over a closed or nonslotted part of said tubular jacket, and not over a slot. This prevents protrusion of the elastic material 17 from inside the tubular jacket 11 during tightening of the clamping sleeve 19.

The pressure applied to the outside surface 14 of the tubular jacket 11 is uniformly applied and is in substantially radial directions, so that as the hollow space 18 is compressed or decreased in cross-sectional area it retains its geometric configuration. The retention of its form by the hollow space 18 insures that the screw pump retains its output capacity, especially when abrasion is compensated for during high pressure conveying operation of said screw pump.

Figure 3:
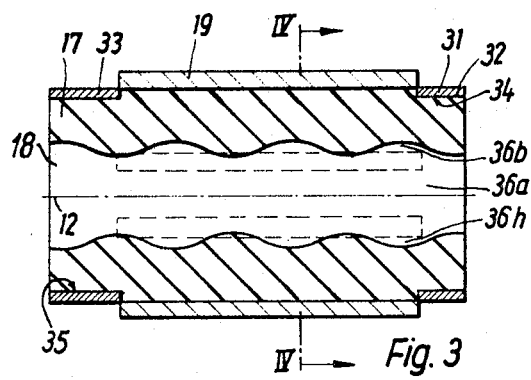
FIG. 3 is an axial section of a modification of the embodiment of FIG. 1.
Figure 4:
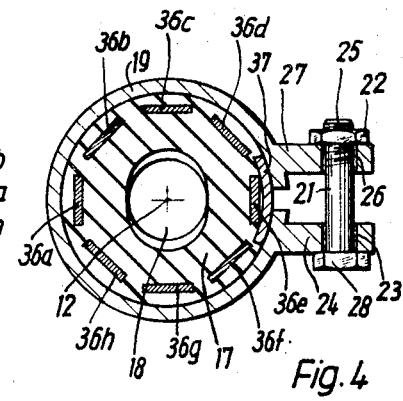
FIG. 4 is a cross-sectional view of the modification of FIG. 3, taken along the lines IV—IV of FIG. 3.

In the the modification of FIGS. 3 and 4, the tubular jacket 31 comprises a pair of spaced end rings 32 and 33 of annular configuration. Each of the end rings 32 and 33 has an inside surface 34 and 35, respectively, of cylindrical configuration. A plurality of connecting members 36a, 36b, 36c, 36d, 36e, 36f, 36g and 36h join the end rings 32 and 33, only the connecting members 36a, 36b and 36h being shown in FIG. 3 in order to maintain the clarity of illustration.

Each of the connecting members 36a to 36h is of substantially rectangular parallelopiped configuration and of the same dimensions as the others of said connecting members. Each of the connecting members 36a and 36h is of substantially flat bar configuration and extends parallel to the axis 12. The connecting members 36a to 36h are equiangularly spaced from each other. Each of the connecting members 36a to 36h is affixed at one end to the inside surface 34 of the end ring 32 of the tubular jacket 31 and each of said connecting members is affixed at its other end to the inside surface 35 of the end ring 33.

In the modification of FIGS. 3 and 4, the tubular jacket 31 is thus of substantially lattice-type configuration and comprises any suitable material such as, for example, a metal, such as iron. The connecting members 36a to 36h may be affixed to the inside surfaces of the end rings 32 and 33 by any suitable means such as, for example, welding. The clamping sleeve 19 is the same as that utilized in the modification of FIGS. 1 and 2.

Actually, the clamping sleeve 19 of FIGS. 3 and 4 extends for a length which is just slightly smaller than the length of the space between the end rings 32 and 33 and fits over the connecting members 36a to 36h thereby closing the space between said end rings. The inside diameter of the clamping sleeve 19 should be slightly larger than the outside diameter of the end rings 32 and 33, as shown, in order to enable the positioning of said clamping sleeve on the tubular jacket 31.

The fitting of the clamping sleeve 19 over the connecting members 36a to 36h between the end rings 32 and 33 prevents the protrusion of the elastic material 17 out of the tubular jacket 31 due to the high internal pressure of the pump. The part or parts of the connecting member or members adjacent to and exposed by the space between the first and second extending portions 24 and 27 is preferably covered with a cylindrical segment part 37 (FIG. 4).

Figure 5:
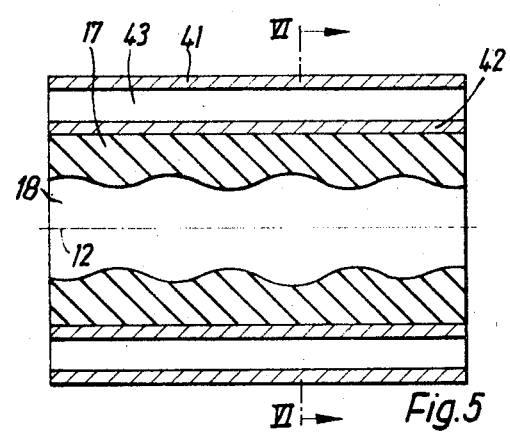
FIG. 5 is an axial section of another modification of the embodiment of FIG. 1.
Figure 6:
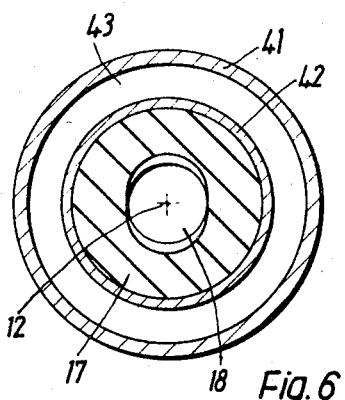
FIG. 6 is a cross-sectional view of the modification of FIG. 5, taken along the lines VI—VI of FIG. 5.

In the modification of FIGS. 5 and 6, the pressure apparatus comprises a pressure cylinder 41 coaxially positioned around the tubular jacket 42 and having an inside diameter which is sufficiently larger than the outside diameter of said tubular jacket so that said pressure cylinder is radially spaced from said tubular jacket to form a substantially annular pressure chamber 43 around said tubular jacket.

The tubular jacket 42 may be of hollow cylindrical configuration or may comprise the tubular jacket 31 of the modification of FIGS. 3 and 4 with the clamping sleeve 19 of said figures in position on said tubular jacket. A pressure medium such as, for example, air or gas, oil or hydraulic fluid, is supplied to the pressure chamber 43 by any suitable means, not shown in the figures.

The pressure of the pressure medium in the pressure chamber 43 may be varied by any suitable means (not shown in the figures) to vary the pressure on the tubular jacket 42 and thereby vary the pressure on the elastic material 17 and thus vary the cross-sectional area of the hollow space 18 formed by said elastic material. An increase in pressure of the pressure medium in the pressure chamber 43 decreases the cross-sectional area of the hollow space 18. The modification of FIGS. 5 and 6 is especially suitable for remote control for compensation for wear and abrasion and to prevent internal slippage and control the quantity of material conveyed by the pump.

The modification of FIGS. 5 and 6 is also suitable for controlling overpressure in an eccentric screw pump. To decrease the quantity of material conveyed by the pump and to prevent further increase in pressure upon a predetermined pressure being attained in the screw pump, all that is required is to decrease the pressure of the pressure medium in the pressure chamber 43 thereby decreasing the elastic tension in the elastic material 17.

While the invention has been described by means of specific examples and in specific embodiments, I do not wish to be limited thereto, for obvious modifications will occur to those skilled in the art without departing from the spirit and scope of the invention.

What I claim is:

1. A stator for a screw pump comprising a tubular jacket having an axis, said tubular jacket comprises a pair of spaced end rings of substantially annular configuration and a plurality of connecting members joining said end rings, each of said connecting members extending parallel to said axis; elastic material on the inside surface of said tubular jacket forming an axially extending hollow space around said axis in a worm configuration, said hollow space having a cross-sectional area at each point along said axis; and pressure means for applying pressure to the outside surface of said tubular jacket directed toward the inside thereof thereby to compress the cross-sectional area of the hollow space formed by said elastic material.

2. A stator for a screw pump as claimed in claim 1, wherein said connecting members are equiangularly spaced from each other and each of said connecting members is of substantially flat bar configuration.

3. A stator for a screw pump as claimed in claim 1, wherein said pressure means comprises a clamping sleeve coaxially positioned on said tubular jacket and mechanical means for decreasing the diameter of said clamping means.

4. A stator of a screw pump as claimed in claim 2, wherein each of said end rings has an inside cylindrical surface and said connecting members are affixed to the inside cylindrical surfaces of said end rings.

5. A stator for a screw pump as claimed in claim 4, wherein said pressure means comprises a clamping sleeve coaxially positioned on said tubular jacket and mechanical means for decreasing the diameter of said clamping means.

6. A stator for a screw pump comprising a tubular body made from elastic material having a cylindrical outside surface and forming an axially extending hollow space with a worm configuration; a plurality of adjustable pressure bars each having the shape of a cylindrical segment, said bars being arranged equiangularly in spaced relation to each other around said cylindrical surface; a pair of annular end-pieces integrally connected with said bars and forming therewith a cylindrical body with axially extending slots; a clamping sleeve disposed abuttingly on the outside of said cylindrical body and coaxially therewith; said pressure bars act upon said cylindrical outside surface to reduce the diameter of said tubular body when pressure is exerted by said clamping sleeve against said cylindrical body.

7. A stator for a screw pump as set forth in claim 6 wherein said pressure bars are integrally connected with said outside surface by vulcanization.

References Cited

UNITED STATES PATENTS

| 2,765,114 | 10/1956 | Chang. |
| 2,796,029 | 6/1957 | Bourke. |
| 2,874,643 | 2/1959 | Bourke. |
| 2,879,920 | 3/1959 | Davies. |
| 3,011,445 | 12/1961 | Bourke. |
| 3,028,812 | 4/1962 | Scotti. |
| 3,084,631 | 4/1963 | Bourke. |

FOREIGN PATENTS

| 1,258,107 | 2/1961 | France. |
| 799,996 | 8/1958 | Great Britain. |

DONLEY J. STOCKING, *Primary Examiner.*

WILBUR J. GOODLIN, *Assistant Examiner.*